US006999914B1

(12) United States Patent
Boerner et al.

(10) Patent No.: US 6,999,914 B1
(45) Date of Patent: Feb. 14, 2006

(54) DEVICE AND METHOD OF DETERMINING EMOTIVE INDEX CORRESPONDING TO A MESSAGE

(75) Inventors: Peer Boerner, Valrico, FL (US); James Frey, Fairport, NY (US)

(73) Assignee: Manning And Napier Information Services LLC, Rochester, NY (US)

( * ) Notice: Subject to any disclaimer, the term of this patent is extended or adjusted under 35 U.S.C. 154(b) by 778 days.

(21) Appl. No.: 09/676,296

(22) Filed: Sep. 28, 2000

(51) Int. Cl.
*G06F 17/20* (2006.01)
*G06F 17/27* (2006.01)

(52) U.S. Cl. .............................. 704/1; 704/9
(58) Field of Classification Search ............ 704/1, 704/2–6, 9; 395/708, 751; 707/5; 715/530–532
See application file for complete search history.

(56) References Cited

U.S. PATENT DOCUMENTS

| 5,440,481 | A | * | 8/1995 | Kostoff et al. ............. 707/5 |
| 5,642,518 | A | * | 6/1997 | Kiyama et al. ............. 704/7 |
| 5,696,981 | A | * | 12/1997 | Shovers ..................... 704/10 |
| 5,873,056 | A | | 2/1999 | Liddy et al. ................ 704/9 |
| 5,963,940 | A | | 10/1999 | Liddy et al. ................ 707/5 |
| 6,332,143 | B1 | * | 12/2001 | Chase ....................... 707/100 |
| 6,363,346 | B1 | * | 3/2002 | Walters ..................... 704/231 |
| 6,389,415 | B1 | * | 5/2002 | Chase ....................... 707/5 |
| 6,418,435 | B1 | * | 7/2002 | Chase ....................... 707/5 |
| 6,622,140 | B1 | * | 9/2003 | Kantrowitz ................. 707/5 |
| 6,718,367 | B1 | * | 4/2004 | Ayyadurai .................. 709/206 |
| 6,721,734 | B1 | * | 4/2004 | Subasic et al. ............. 707/5 |

* cited by examiner

*Primary Examiner*—David L. Ometz
*Assistant Examiner*—Matthew J Sked
(74) *Attorney, Agent, or Firm*—Hodgson Russ LLP

(57) ABSTRACT

The invention includes a method and a device for determining an emotive index for a message. In the method, a message is received and words in the message are identified for analysis. An emotive index corresponding to the identified words is then determined. The emotive index is preferably a function of a word count index corresponding to the number of identified words, an affinity index and an antagonism index. A device according to the present invention includes a computer readable storage medium having encoded thereon computer readable instructions capable of instructing a computer to carry out the method.

76 Claims, 10 Drawing Sheets

| |
|---|
| - |
| |
| LYCOShop |
| Get free e-mail |
| What are you N2 |
| HotBot - |
| A FREE web-based e-m |
| > |
| *** |
| Angelfire for your f |
| Subj: |
| Movies? TV Comm |
| -Forwarded Message: |

FIG. 2

| Sampling Class | Indicator | Case Sensitive? |
|---|---|---|
| Competition | "amazon" | 0 |
| Competition | "cheaper" | 0 |
| Competition | "competition" | 0 |
| Competition | "competitor" | 0 |
| Competition | "compusa" | 0 |
| Competition | "dvdexpress" | 0 |
| Competition | "elsewhere" | 0 |
| Competition | "just have to" | 0 |
| Competition | "necx" | 0 |
| Competition | "netflix" | 0 |
| Competition | "pc connection" | 0 |
| Competition | "someplace else" | 0 |
| Competition | "somewhere else" | 0 |
| Competition | "totale" | 0 |
| Contented | "amaze" | 0 |
| Contented | "amazing" | 0 |
| Contented | "appreciate" | 0 |
| Contented | "elat" | 0 |
| Contented | "excellent" | 0 |
| Contented | "fabulous" | 0 |
| Contented | "good work" | 0 |
| Contented | "great" | 0 |
| Contented | "impress" | 0 |
| Contented | "look forward" | 0 |
| Contented | "looking forward" | 0 |
| Contented | "pleased" | 0 |
| Contented | "satisf" | 0 |
| Contented | "Wow" | 0 |
| Contradiction | "yet" | 0 |
| Contradiction | "although" | 0 |
| Contradiction | "but" | 0 |
| Contradiction | "despite" | 0 |
| Contradiction | "however" | 0 |
| Contradiction | "in spite of" | 0 |
| Defamation | "am going to tell" | 0 |
| Defamation | "badmouth" | 0 |
| Defamation | "everyone know" | 0 |
| Defamation | "spread the word" | 0 |
| Defamation | "will tell" | 0 |
| Delay | "delay" | 0 |
| Delay | "ever" | 0 |
| Delay | "everytime" | 0 |
| Delay | "long time" | 0 |
| Delay | "still have" | 0 |
| Delay | "taking so long" | 0 |

FIG. 3A

| Sampling Class | Indicator | Case Sensitive? |
|---|---|---|
| Delay | "too long" | 0 |
| Derogatory | "awful" | 0 |
| Derogatory | "bad" | 0 |
| Derogatory | "bullshit" | 0 |
| Derogatory | "disorgani" | 0 |
| "Derogatory | "dumb" | 0 |
| Derogatory | "lazy" | 0 |
| Derogatory | "outrageous" | 0 |
| Derogatory | "ridiculous" | 0 |
| Derogatory | "scam" | 0 |
| Derogatory | "screw up" | 0 |
| Derogatory | "stupid" | 0 |
| Derogatory | "sucks" | 0 |
| Derogatory | "terrible" | 0 |
| Derogatory | "unacceptab" | 0 |
| Derogatory" | "worst" | 0 |
| Emotional indicator | "angry" | 0 |
| Emotional indicator | "annoyed" | 0 |
| Emotional indicator | "disappoint" | 0 |
| Emotional indicator | "dissatisf" | 0 |
| Emotional indicator | "frustrat" | 0 |
| Emotional indicator | "pissed" | 0 |
| Emotional indicator | "pleased" | 0 |
| Emotional indicator | "upset" | 0 |
| Fault assessment | "bother" | 0 |
| Fault assessment | "mistake" | 0 |
| I AM | "I am" | 0 |
| I AM | "I'm" | 0 |
| Imperative | "Cancel" | 1 |
| Imperative | "Credit m" | 1 |
| Imperative | "Don't" | 1 |
| Imperative | "Refund m" | 1 |
| Imperative | "Reinstate" | 1 |
| Imperative | "Send" | 1 |
| Imperative | "Stop" | 1 |
| Imperative | "Tell" | 1 |
| Inconvenience | "inconvenien" | 0 |
| Inconvenience | "too late" | 0 |
| Inconvenience | "trouble" | 0 |
| Inconvenience | "very frustrat" | 0 |
| Inconvenience | "wasting" | 0 |
| Information | "any information" | 0 |
| Information | "no information" | 0 |
| Institution | "attorney" | 0 |
| Institution | "better business" | 0 |
| Institution | "consumer fraud" | 0 |

FIG. 3B

| Sampling Class | Indicator | Case Sensitive? |
|---|---|---|
| | "consumer" | |
| Institution | "protection" | 0 |
| Institution | "crime" | 0 |
| Institution | "criminal" | 0 |
| Institution | "file suit" | 0 |
| Institution | "law" | 0 |
| Institution | "laws" | 0 |
| Institution | "lawyer" | 0 |
| Institution | "prosecut" | 0 |
| Institution | "regulation" | 0 |
| Institution | "statute" | 0 |
| Institution | "sue" | 1 |
| Intensifier | "!!" | 0 |
| Intensifier | "deeply" | 0 |
| Intensifier | "extremely" | 0 |
| Intensifier | "I am very" | 0 |
| Intensifier | "I'm very" | 0 |
| Intensifier | "NOT" | 1 |
| Invective | "ass" | 0 |
| Invective | "-ass" | 0 |
| Invective | "asshole" | 0 |
| Invective | "bullshit" | 0 |
| Invective | "bullshit" | 0 |
| Invective | "chrissake" | 0 |
| Invective | "damn" | 0 |
| Invective | "dipshit" | 0 |
| Invective | "fuck" | 0 |
| Invective | "god dam" | 0 |
| Invective | "goddam" | 0 |
| Invective | "god-dam" | 0 |
| Invective | "god's sake" | 0 |
| Invective | "godsake" | 0 |
| Invective | "shit" | 0 |
| Manager | "a manager" | 0 |
| Manager | "supervisor" | 0 |
| Matching | "beat" | 0 |
| Matching | "match" | 0 |
| Misinformation | "advised me" | 0 |
| Misinformation | "had known" | 0 |
| Misinformation | "informed me" | 0 |
| Misinformation | "led to believe" | 0 |
| Misinformation | "means" | 0 |
| Misinformation | "mislead" | 0 |
| Misinformation | "misled" | 0 |
| Misinformation | "misrepresent" | 0 |
| Misinformation | "notif" | 0 |
| Misinformation | "promise" | 0 |
| Misinformation | "say" | 0 |

FIG. 3C

| Sampling Class | Indicator | Case Sensitive? |
|---|---|---|
| Misinformation | "surpri" | 0 |
| Misinformation | "was told" | 0 |
| Misinformation | "would have thought" | 0 |
| Misinformation | "would think" | 0 |
| Misinformation | "you told me" | 0 |
| Modal | "ould have" | 0 |
| Modal | "ould not have" | 0 |
| Modal | "ouldn't have" | 0 |
| Modal | "you need to" | 0 |
| Monetary | "$" | 0 |
| Monetary | "charge" | 0 |
| Monetary | "compens" | 0 |
| Monetary | "credit" | 0 |
| Monetary | "discount" | 0 |
| Monetary | "expens" | 0 |
| Monetary | "money" | 0 |
| Monetary | "pay" | 0 |
| Monetary | "price" | 0 |
| Monetary | "refund" | 0 |
| Monetary | "tax" | 0 |
| Negative | "cannot" | 0 |
| Negative | "no" | 0 |
| Negative | "none" | 0 |
| Negative | "not" | 0 |
| Negative | "n't" | 0 |
| Never | "never" | 0 |
| Never | "not ever" | 0 |
| Never | "n't ever" | 0 |
| Pricing | "price" | 0 |
| Pricing | "pricing" | 0 |
| Repetition | "again" | 0 |
| Repetition | "attempted" | 0 |
| Repetition | "each time" | 0 |
| Repetition | "every time" | 0 |
| Repetition | "everytime" | 0 |
| Repetition | "first time" | 0 |
| Repetition | "fourth time" | 0 |
| Repetition | "getting out of hand" | 0 |
| Repetition | "I keep" | 0 |
| Repetition | "keeps" | 0 |
| Repetition | "last time" | 0 |
| Repetition | "many time" | 0 |
| Repetition | "numerous" | 0 |
| Repetition | "once already" | 0 |
| Repetition | "originally" | 0 |
| Repetition | "second time" | 0 |

FIG. 3D

| Sampling Class | Indicator | Case Sensitive? |
|---|---|---|
| Repetition | "several time" | 0 |
| Repetition | "third time" | 0 |
| Repetition | "times" | 0 |
| Repetition | "tried" | 0 |
| Repetition | "twice" | 0 |
| Severance | "another source" | 0 |
| Severance | "another vendor" | 0 |
| Severance | "business elsewhere" | 0 |
| Severance | "close my account" | 0 |
| Severance | "do business" | 0 |
| Severance | "lose a customer" | 0 |
| Severance | "lose business" | 0 |
| Severance | "lost a customer" | 0 |
| Severance | "somewhere else" | 0 |
| Severance | "will no longer" | 0 |
| Sorry | "my apolog" | 0 |
| Sorry | "my mistake" | 0 |
| Sorry | "sorry" | 0 |
| Sorry | "to apolog" | 0 |
| System error | "doesn't work" | 0 |
| System error | "error" | 0 |
| System error | "not work" | 0 |
| System error | "pass word" | 0 |
| System error | "password" | 0 |
| System error | "user name" | 0 |
| System error | "username" | 0 |
| System error | "wont work" | 0 |
| System error | "won't work" | 0 |
| Thanks | "thank" | 0 |
| Thanks | "thanx" | 0 |
| Thanks | "thx" | 0 |
| Thanks | "tia" | 0 |
| Urgency | "asap" | 0 |
| Urgency | "HELP" | 1 |
| Urgency | "immediate" | 0 |
| Urgency | "now" | 0 |
| Urgency | "right away" | 0 |
| Urgency | "soon" | 0 |
| Urgency | "today" | 0 |
| Urgency | "urgen" | 0 |
| Wh-words | "How" | 1 |
| Wh-words | "What" | 1 |
| Wh-words | "When" | 1 |
| Wh-words | "Where" | 1 |
| Wh-words | "Who" | 1 |
| Wh-words | "Why" | 1 |

FIG. 3E

| Sampling Class | Indicator | Case Sensitive? |
|---|---|---|
| Word Occurrence | "anymore" | 0 |
| Word Occurrence | "companies" | 0 |
| Word Occurrence | "complaint" | 0 |
| Word Occurrence | "continue" | 0 |
| Word Occurrence | "decided" | 0 |
| Word Occurrence | "everytime" | 0 |
| Word Occurrence | "explain" | 0 |
| Word Occurrence | "feedback" | 0 |
| Word Occurrence | "hear" | 0 |
| Word Occurrence | "helpful" | 0 |
| Word Occurrence | "holding" | 0 |
| Word Occurrence | "informed" | 0 |
| Word Occurrence | "known" | 0 |
| Word Occurrence | "numerous" | 0 |
| Word Occurrence | "point" | 0 |
| Word Occurrence | "refund" | 0 |
| Word Occurrence | "spending" | 0 |
| Word Occurrence | "talking" | 0 |
| Word Occurrence | "till" | 0 |
| Word Occurrence | "trust" | 0 |

FIG. 3F

DEVICE AND METHOD OF DETERMINING EMOTIVE INDEX CORRESPONDING TO A MESSAGE

BACKGROUND OF THE INVENTION

1. Field of the Invention

The present invention relates generally to devices and methods of determining the emotion expressed in a message.

2. Discussion of Related Art

In the prior art, there are devices and methods of determining a vector representing the content of a message. In one such method and device, a natural language processing system uses unformatted naturally occurring text and generates a subject vector representation of the text, which may be an entire document or a part thereof such as its title, a paragraph, clause, or a sentence therein. The subject codes which are used are obtained from a lexical database and the subject code(s) for each word in the text is looked up and assigned from the database. The database may be a dictionary or other word resource which has a semantic classification scheme as designators of subject domains. Various meanings or senses of a word may have assigned thereto multiple, different subject codes and psycholinguistically justified sense meaning disambiguation is used to select the most appropriate subject field code. Preferably, an ordered set of sentence level heuristics is used which is based on the statistical probability or likelihood of one of the plurality of codes being the most appropriate one of the plurality. The subject codes produce a weighted, fixed-length vector (regardless of the length of the document) which represents the semantic content thereof and may be used for various purposes such as information retrieval, categorization of texts, machine translation, document detection, question answering, and generally for extracting knowledge from the document. The system has particular utility in classifying documents by their general subject matter and retrieving documents relevant to a query. Such devices and methods do not provide an indication of the emotion expressed in the message.

SUMMARY OF THE INVENTION

Accordingly, it is an object of the present invention to provide a method and a device for determining an emotive index for a message. This object is realized by the present invention, that includes a method in which a message is received and words in the message are identified for analysis. The number of identified words is determined and a word count index is determined based on the number of identified words. A list of affinity indicators and a list of antagonism indicators are provided, and the identified words are analyzed to determine which affinity indicators and which antagonism indicators are in the identified words. Then an affinity index is determined from the affinity indicators in the identified words, and an antagonism index is determined from the antagonism indicators in the identified words. Then the word count index, affinity index and antagonism index are combined mathematically to determine the emotive index for the message.

A device according to the present invention includes a computer readable storage medium having encoded thereon computer readable instructions capable of instructing a computer to carry out a method according to the present invention.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which:

FIG. 2 lists some strings that can be used to search for noise text;

FIGS. 3A, 3B, 3C, 3D, 3E and 3F is a list of affinity indicators and antagonism indicators.

BEST MODE FOR CARRYING OUT THE INVENTION

Figure 1A:
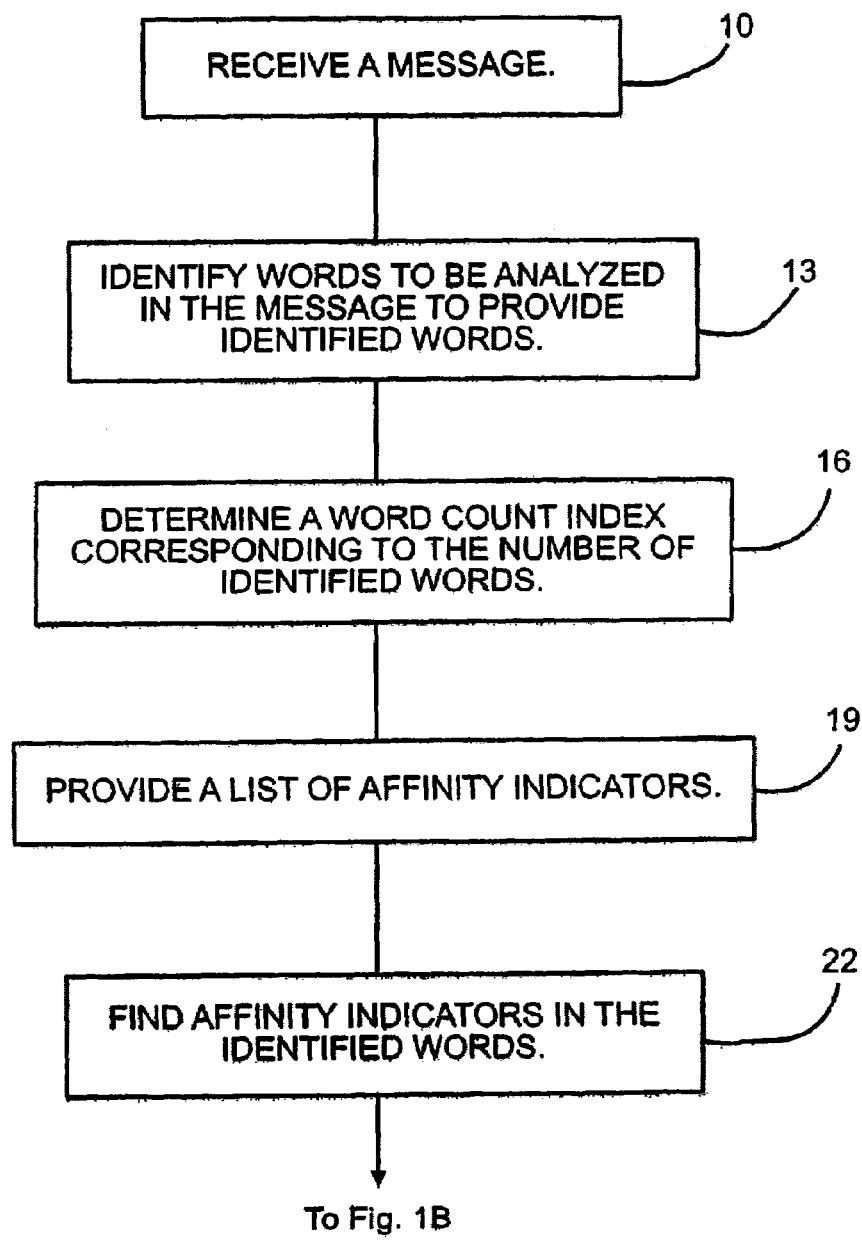
FIGS. 1A and 1B show a flow chart with steps of a method according to the present invention.
Figure 1B:
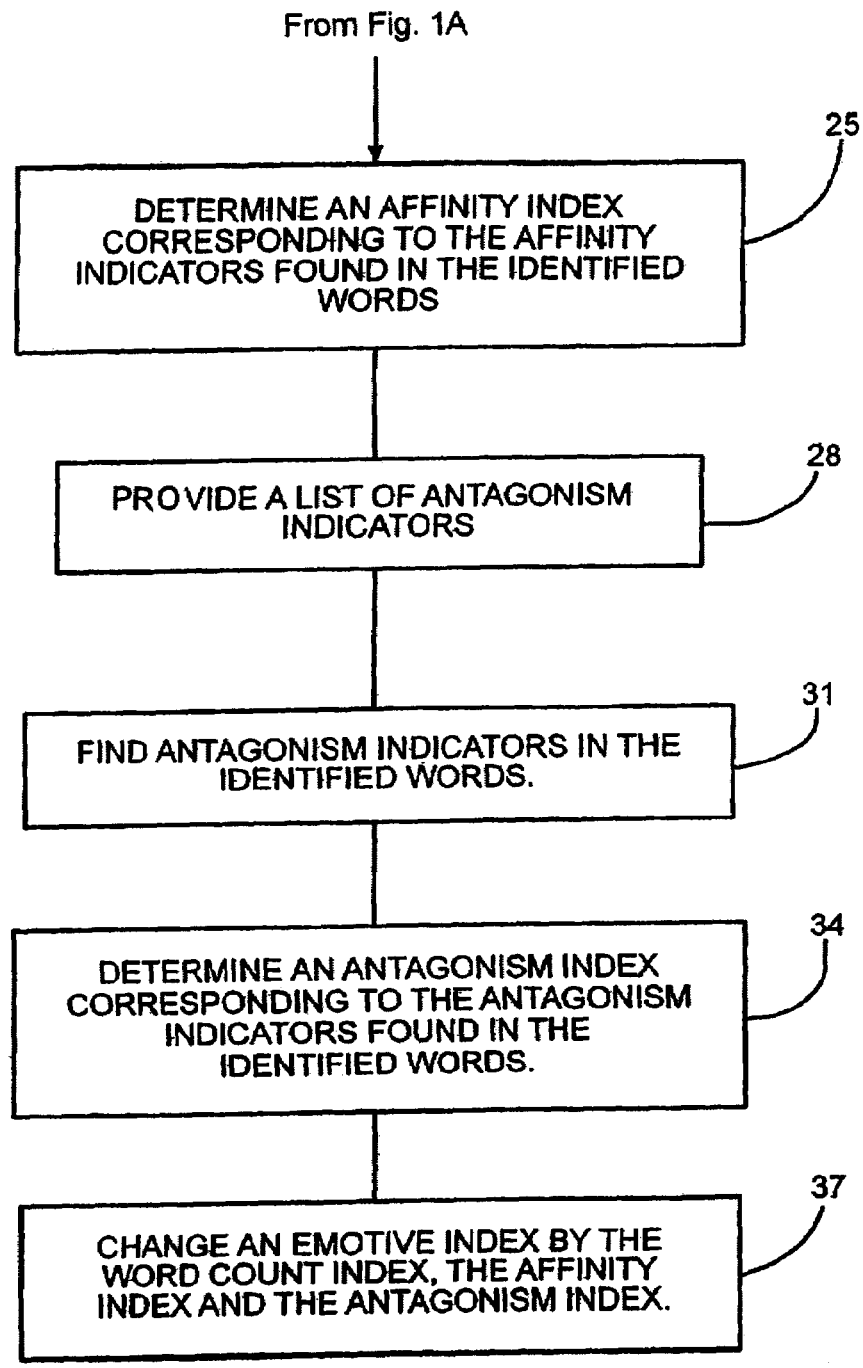

FIGS. 1A and 1B show steps of a method according to the present invention. In an embodiment of the present invention a message is received (step 10) and analyzed. Based on the results of the analysis, the emotion expressed by the writer is determined and presented as an emotive index. For example, it may be determined the emotion expressed in the message is antagonistic or friendly. The emotive index may also give an indication of the degree of emotion expressed in the message.

As an overview of the present invention, an embodiment of the present invention includes determining a word count index (step 16), an affinity index (step 25) and an antagonism index (step 34). If the absolute value of the affinity index is equal to the absolute value of the antagonism index, then the emotive index is set equal to (step 37) the word count index. If the absolute value of the affinity index is not equal to the absolute value of the antagonism index, then the emotive index is a function of the word count index, the affinity index and the antagonism index. For example, the emotive index may be the sum of the word count index, the affinity index and the antagonism index (step 37).

In another embodiment of the present invention, an intensifier index is also determined. If the absolute value of the affinity index is not equal to the absolute value of the antagonism index, then the absolute value of the affinity index is compared to the absolute value of the antagonism index to determine which has the larger absolute value. The affinity index is selected if its absolute value is larger, and the antagonism index is selected if its absolute value is larger. The selected index is weighted by the intensifier index and added to (1) the word count index and (2) the unselected index, either the affinity index or the antagonism index.

To determine the word count index (step 16), the message is received (step 10) and words to be analyzed in the message are identified (step 13) and counted. If the number of identified words is greater than a threshold value, then a word count index is set equal to a first value (step 16). If the number of identified words is less than or equal to the threshold value, then the word count index is set equal to a second value (step 16).

One way of identifying words to be analyzed in the message to provide identified words (step 13) involves determining which words in the message are noise text, and then the noise text is not included in the identified words. For example, a copy of the message could be made, the noise text identified and then removed from the copy of the message, or effectively removed from the copy of the message by identifying the start and end of the noise text, and then the copy of the message is further analyzed in lieu of the original message.

Noise text includes words that are not likely to indicate the emotion expressed in the message or that correspond to other messages. For example, noise text may be a previously sent message, a footer, or may be words cut from a document and pasted into the message. A computer can be used to efficiently identify noise text in the message by searching for certain strings that accompany, for example, earlier messages, footers and words cut from a document and pasted into the message. FIG. 2 lists possible strings that can be used to identify noise text.

In lieu of excluding identified noise text from the identified words, the word count index may be determined (step 16) by counting all of the words in the message, counting all of the words in the noise text, and then subtracting the number of words in the noise text from the total number of words in the message. The phrase "identified words" is used herein to mean the words in the message that are not noise text.

It has been found that the number of identified words is indicative of the emotion expressed in the message. For example, in e-mail messages sent to retailers, it has been found that the longer a message is, the more likely the message is to be antagonistic or unfriendly to the retailer. In particular, when the e-mail message contains more than 179 words, excluding noise text, the emotion expressed in the message is more likely to be antagonistic or unfriendly to the retailer than if the e-mail message contains fewer words. It has also been determined that as the number of words increases, the level of antagonism or unfriendliness tends to increase.

Therefore, in one embodiment of the present invention, the word count index is set equal to −1 if the number of identified words exceeds 179, and is set equal to −0.75 if the number of identified words exceeds 109, but is not greater than 179, and is set equal to −0.5 if the number of identified words exceeds 79 but is not greater than 109 (step 16). When there is an upper limit of interest, for example 179 identified words, counting the identified words can be carried out until the limit is passed, for example 180 words are counted, and then no more counting is performed.

In some circumstances, a message is so short that the emotion of the writer can not be determined by the methods described herein. In those situations, an indication is given that no emotive index can be determined for the message. For example, if the message is less than two words, then it may be best to indicate the message is too short to determine an emotive index, or alternatively, that the message is too short to accurately determine the emotion conveyed in the message.

As described above, the identified words may be analyzed to determine an affinity index (step 25) and an antagonism index (step 34). This can be accomplished after counting is finished, but may also be done before or in conjunction with counting. Analyzing the identified words to determine the affinity index and the antagonism index may be done until the end of the message is reached, or may be done until a certain limit is reached.

Alternatively, analyzing the identified words may depend on the location of certain analyzing limits. For example, certain limits may be determined and then compared to determine which of the limits should be used to set the point at which analyzing the identified words ceases. For example, in one embodiment of the present invention, a noise limit, an auto limit and an end of message limit are determined. Then analyzing continues until one of the limits is encountered. The noise limit is preferably set corresponding to the line number and character position on the line where noise text begins. The auto limit is set corresponding to the line number and character position on the line where the counting limit, for example 180 words, is reached. The end of message limit is set at the end of the message and therefore would only be relevant if no noise limit or counting limit is set.

To determine the affinity index (step 25), a list of affinity indicators is provided (step 19), and the identified words are analyzed to determine whether any of the affinity indicators are present, and if present, which affinity indicators are present (step 22). In some instances, the number of times an affinity indicator is present in the identified words is also determined. Affinity indicators are words that have been determined to indicate the writer is favorably disposed toward the subject of the message. For example, the list of affinity indicators may include the words "appreciate", "excellent" or "fabulous". In some instances, a particular affinity indicator affects the affinity index only if the case of the letters is identical to the case of the letters on the list. For example, it may be that "great" is an affinity indicator, but "Great" and "GREAT" are not.

The presence of certain affinity indicators may have less impact on the affinity index than other affinity indicators. For example, certain affinity indicators may be determined to be more indicative of the emotion of the writer when found in a message, and such affinity indicators will affect the affinity index to a greater degree than other affinity indicators that are less likely to correspond with the emotion conveyed in the message. For example, if "appreciate" and "happy" are affinity indicators, "appreciate" may have an affinity value of +1 while "happy" has an affinity value of +2 because it has been determined that when "happy" is present in the identified words the message has a greater degree of affinity.

Other affinity indicators may appear multiple times in a message, but the number of times such affinity indicators appear in a message has been found not to correspond with a greater degree of affinity. In these situations, analysis of the identified words determines whether or not the affinity indicator is present, and does not count the number of times the affinity indicator is present. For example, it may be that when the word "glad" appears in the identified words, there is little or no increase in the degree of affinity expressed in the message if "glad" appears more than once. In such a situation, an affinity value of +1.4 might be assigned if the identified words contain "glad" at least once, i.e. the affinity index would be changed by +1.4 if "glad" occurs once or occurs more than once.

Affinity indicators may be comprised of more than one word. For example, the phrase "look forward" may be an affinity indicator for messages sent to retailers. As another example, a group of words may be an affinity indicator, and if each of the words in the group appear anywhere in the identified words, the affinity indicator corresponding to the group is deemed present in the identified words. In such situations, analysis of the identified words involves determining whether the phrase or words in a group, as the case may be, appear in the identified words. For example, if the word "like" and the word "good" are a group of words constituting an affinity indicator, then if the word "like" and the word "good" are found in the identified words, the affinity indicator is deemed found, and the corresponding affinity value is selected. An affinity indicator having more than one word may include words that are themselves affinity indicators or antagonism indicators (described below), or may include words that are not themselves affinity indicators or antagonism indicators.

An affinity index according to the present invention is determined by adding the affinity values corresponding to the affinity indicators determined to be in the identified words. So, for example, using the examples above, an affinity index for identified words having "appreciate" one time, "happy" two times and "glad" five times would be 5.4 since (1) (+1)+(2) (+2)+(+1.4)=+5.4.

To determine the antagonism index (step 34), a list of antagonism indicators is provided (step 28), and the identified words are analyzed to determine whether any of the antagonism indicators are present, and if present, which antagonism indicators are present (step 31). In some instances, the number of times an antagonism indicator is present in the identified words is also determined. Antagonism indicators are words that have been determined to indicate the writer is not favorably disposed toward the subject of the message. For example, the list of antagonism indicators may include the words "bad", "lazy" and "scam". In some instances, a particular antagonism indicator affects the antagonism index only if the case of the letters is identical to the case of the letters on the list. For example, it may be that "awful" is an antagonism indicator, but "Awful" and "AWFUL" are not.

The presence of certain antagonism indicators may have less impact on the antagonism index than other antagonism indicators. For example, certain antagonism indicators may be determined to be more indicative of the emotion of the writer when found in a message, and such antagonism indicators will affect the antagonism index to a greater degree than other antagonism indicators that are less likely to correspond with the emotion conveyed in the message. For example, if "awful" and "bad" are antagonism indicators, "awful" may have an antagonism value of −1 while "bad" has an antagonism value of −2 because it has been determined that when "bad" is present in the identified words, the message has a greater degree of antagonism.

Other antagonism indicators may appear multiple times in a message, but the number of times such antagonism indicators appear in a message has been found not to correspond with a greater degree of antagonism. In these situations, analysis of the identified words determines whether or not the antagonism indicator is present, and does not count the number of times the antagonism indicator is present. For example, if "stupid" is such an antagonism indicator, an antagonism value of −1.3 might be assigned if the identified words contain "stupid" at least once, i.e. the antagonism index would be changed by −1.3 if "stupid" occurs once or more than once.

Antagonism indicators may be comprised of more than one word. For example, the phrase "screw up" may be an antagonism indicator for messages sent to retailers. As another example, a group of words may be an antagonism indicator, and if each of the words in the group appear anywhere in the identified words, the antagonism indicator corresponding to the group is deemed present in the identified words. In such situations, analysis of the identified words involves determining whether the phrase or words in a group, as the case may be, appear in the identified words. For example, if the word "hate" and the word "stupid" are a group of words constituting an antagonism indicator, then if the word "hate" and the word "stupid" are found in the identified words, the antagonism indicator is deemed found, and the corresponding antagonism value is selected. An antagonism indicator having more than one word may include words that are themselves antagonism indicators or affinity indicators, or may include words that are not themselves antagonism indicators or affinity indicators.

An antagonism index according to the present invention is determined by adding the antagonism values corresponding to the antagonism indicators found in the identified words. So, for example, using the examples above, an antagonism index for identified words having "awful" twice, "bad" three times and "stupid" six times would be −9.3 since (2) (−1)+(3) (−2)+(−1.3)=−9.3.

FIGS. 3A through 3F list some affinity indicators and some antagonism indicators corresponding to a book retailer. The indicators appear under the heading "indicator" and the "sampling class" heading, discussed in more detail below, indicates information related to how a particular indicator is treated.

Analyzing the identified words may also include determining whether intensifiers are present. An intensifier is a word that is used to modify another word. Adjectives and adverbs are likely candidates for being intensifiers. For example, in the phrase "really amazing", the word "amazing" might be an affinity indicator, and the word "really" might be an intensifier.

In a sophisticated embodiment of the method, the identified words would be analyzed to determine whether any of the intensifiers are present, and if present, which intensifiers are present. In some instances, the number of times an intensifier is present in the identified words is also determined. In some instances, a particular intensifier affects the intensifier index only if the case of the letters is identical to the case of the letters on the list. For example, it may be that "totally" is an intensifier, but "Totally" and "TOTALLY" are not.

The presence of certain intensifiers may have less impact on the intensifier index than other intensifiers. For example, certain intensifiers may be determined to be more indicative of the emotion of the writer when found in a message, and such intensifiers will affect the intensifier index to a greater degree than other intensifiers that are less likely to correspond with the emotion conveyed in the message.

Other intensifiers may appear multiple times in a message, but the number of times such intensifiers appear in a message has been found not to correspond with a greater degree of affinity or antagonism. In these situations, analysis of the identified words determines whether or not the intensifier is present, and does not count the number of times the intensifier is present.

Intensifiers may be comprised of more than one word. For example, the phrase "totally bodacious" might be an intensifier for messages sent to retailers. As another example, a group of words may be an intensifier, and if each of the words in the group appear anywhere in the identified words, the intensifier corresponding to the group is deemed present in the identified words. In such situations, analysis of the identified words involves determining whether the phrase or words in a group, as the case may be, appear in the identified words. For example, if the word "great" and the word "super" are a group of words constituting an intensifier, then if the word "great" and the word "super" are found in the identified words, the intensifier is deemed found, and the corresponding intensifier value is selected. An intensifier having more than one word may include words that are themselves intensifiers, antagonism indicators or affinity indicators, or may include words that are not themselves intensifiers, antagonism indicators or affinity indicators.

Finally, a sophisticated embodiment of the present invention determines the location of an intensifier in the message and links the intensifier to an affinity indicator or an antagonism indicator. Linking may be accomplished by determining the location of the nearest indicator, affinity or antagonism. The nearest indicator is then linked to the intensifier. The affinity index or antagonism index, as the case may be, is a function of the value associated with the linked indicator and the value associated with the linked intensifier. For example, the affinity index would be augmented by the product of a linked intensifier value and a linked affinity value.

In a simplified embodiment of the present invention, a list of intensifiers is provided and the presence of any of the listed intensifiers in the message causes the intensifier index to be set at a particular value. In this simplified method, the intensifier index would be a particular value regardless of the number of intensifiers present in the identified words, regardless of which intensifiers are present, and regardless of where the intensifiers are or what other words they are associated with. The intensifier index is then used to augment the affinity index or the antagonism index, as described below in more detail.

To further illustrate the method of the present invention, a particular embodiment of the invention is described below. Initially, a message is received (step 10) and an emotive index is set to zero. Words in the message are identified for analysis (step 13). An affinity index, an antagonism index, and an intensifier index are all set to zero. A list of affinity indicators (step 19), a list of antagonism indicators (step 28), and a list of intensifiers is provided. The identified words are analyzed to determine an affinity index (step 25), an antagonism index (step 34) and an intensifier index for the message. Then the emotive index is changed (step 37) according to the determined affinity index, the antagonism index and the intensifier index.

As an example, once the affinity index (step 25), antagonism index (step 34) and intensifier index for the message are determined, the absolute value of the affinity index is compared to the absolute value of the antagonism index to determine which absolute value is greater. If the absolute value of the affinity index is greater, then the intensifier index is multiplied with the affinity index to provide a modified index. If the absolute value of the antagonism index is greater, then the intensifier index is multiplied with the antagonism index to provide the modified index. The emotive index is then changed (step 37) by an amount equal to the sum of the modified index plus either the affinity index or the antagonism index, which ever one has the lower absolute value. The emotive index may also be changed (step 37) by an amount equal to a word count index for the message.

In addition to determining an emotive index for a message, the present invention includes a method which provides other information about the message. In one embodiment of the present invention, the affinity indicators and the antagonism indicators are categorized into sampling classes. FIGS. 3A through 3F show examples of the types of sampling classes and the corresponding indicators (affinity and antagonism). Once a determination is made as to which affinity indicators and which antagonism indicators are present in the identified words, a determination is made as to which sampling classes are present in the identified words. For example, if the words "price" and "match" appear in the identified words, the corresponding sampling classes, as shown in FIGS. 3D and 3C respectively, are "pricing" and "matching".

Once the sampling classes corresponding to the identified words are determined, a comparison may be made against predetermined combinations of sampling classes. The predetermined combinations are those combinations of sampling classes that have been determined to be of interest, and when a predetermined combination is among the sampling classes determined to be in the identified words, a signal is presented. For example, for retailers a predetermined combination of sampling classes is the combination of "pricing" and "matching" sampling classes, because retailers are interested in knowing whether a message exhibits a desire on the part of the author to have a price matched. Therefore, if a message has indicators in both the "pricing" sampling class and the "matching" sampling class, a signal, such as an indicator message, is provided that identifies the message as such. For example, the indicator message might be the words "price match". Another example of a predetermined combination found to be important to retailers is the combination of the "emotional indicator" sampling class and the "i am" sampling class.

The idea of a predetermined combination can be extended to include negative combinations of sampling classes. For example, it may be important to identify messages that have indicators in a first sampling class but do not have indicators in a second sampling class. For example, a "competition" message could be sent when the "competition" sampling class is identified in the message, but the "price" and "matching" sampling classes are not identified in the message. Another example of using a negative combination is that a "fault assessment" message is sent when the "fault assessment" sampling class is identified in a message, but the "sorry" sampling class is not identified in the message. By using predetermined combinations of sampling classes, including negative combinations, additional information can be provided that may be of use in assessing messages received.

The sampling classes may also be used to determine the affinity index and the antagonism index. For example, a class value for each class may be determined, and then all the class values for classes corresponding to affinity indicators are added together to provide the affinity index. Similarly, all the class values for classes corresponding to antagonism indicators are added together to provide the antagonism index. One advantage of determining the class values and then adding the class values to arrive at an index is that one class value may be determined in a manner that is different from the manner of determining another class value, and thereby provide greater flexibility in how the index is determined.

Three examples of methods of determining class values are set forth below, although the present invention is not limited to the three methods described. A first method is called the "sum total" method. In the sum total method, the class value is determined by counting the number of times each indicator in the sampling class appears in the identified words. Each indicator value is then multiplied by the corresponding number of times the indicator appears in the identified words, and the resulting products are summed to provide the class value.

Another method of determining a class value is called the "sample total" method. In the sample total method, the class value is determined by determining which indicators in the class appear in the identified words and then adding the indicator values of those indicators to provide the class value. In this method, the number of times an indicator appears in the identified words is not important.

A third method of determining a class value is called the "binary" method. In the binary method, each class has a predetermined class value, and a determination is made as to whether any of the indicators in the sampling class are present in the identified words. If any of the indicators in the sampling class are present in the identified words, the predetermined class value is used to augment the index. In this method, it is not necessary to determine which indicators in the sampling class are present in the identified words, or how many times any of the indicators are present in the identified words. It is sufficient that at least one of the indicators in the class appears at least once in the identified words.

Figure 4:
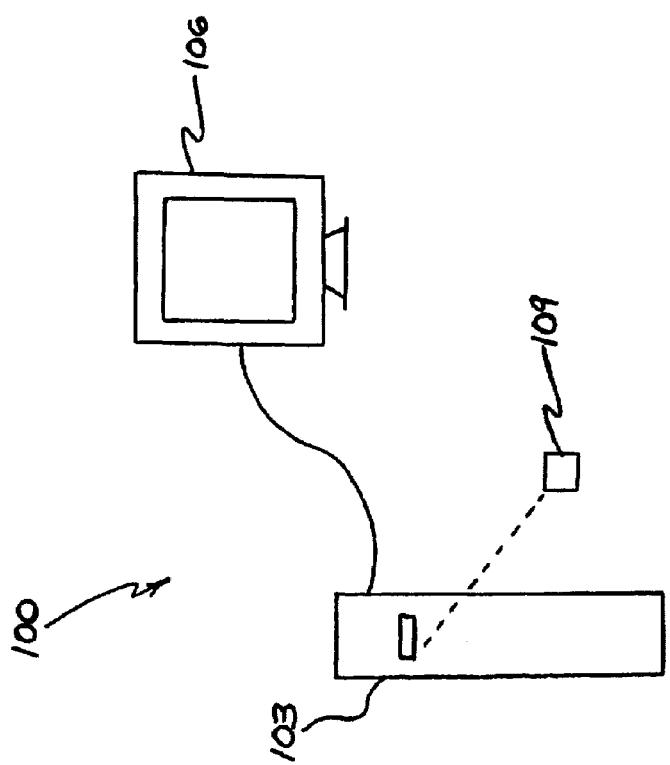
FIG. 4 is a schematic of a system according to the present invention.

The present invention also includes a device for carrying out the method described. FIG. 4 shows a system 100 for carrying out the method of the present invention that includes a computer 103 having a central processing unit, a monitor 106 and a device for instructing 109. The device for instructing 109 may be a computer readable storage medium having encoded thereon computer readable instructions capable of instructing the computer 103 to carry out the method. The storage medium may be a compact disk, floppy disk, read-only-memory or random-access-memory. Such a storage medium may have encoded thereon instructions for the computer 103 to receive a message, set an emotive index to zero, set a word count value to zero, identify words to be analyzed in the message, increment the word count value each time an identified word is encountered until an ending point is reached, determine whether the word count value is greater than a threshold value, set a word count index equal to a first value if the word count value is greater than the threshold value, and set the word count index equal to a second value if the word count value is not greater than the threshold value, and change the emotive index by the word count index.

Such a storage medium may have encoded thereon instructions for the computer 103 to identify words to be analyzed in the message, set an affinity index to zero, receive a list of affinity indicators, analyze the identified words to determine which affinity indicators are in the message, change the affinity index by an affinity amount corresponding to the affinity indicators determined to be in the message, set an antagonism index to zero, receive a list of antagonism indicators analyze the identified words to determine which antagonism indicators are in the message, change the antagonism index by an antagonism amount corresponding to the antagonism indicators determined to be in the message, change the emotive index by a difference amount equal to the difference between the absolute value of the affinity index and the absolute value of the antagonism index.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of determining an emotive index for a message, comprising:
    receiving a message;
    identifying words to be analyzed in the message to provide identified words;
    incrementing a word count value each time an identified word is encountered until an ending point is reached;
    determining whether the word count value is greater than a threshold value;
    setting a word count index equal to a first value if the word count value is greater than a threshold value, and setting the word count index equal to a second value if the word count value is not greater than the threshold value;
    changing an emotive index by the word count index;
    providing a list of intensifiers;
    analyzing the identified words to find an intensifier;
    providing a list of affinity indicators;
    analyzing the identified words to find affinity indicators;
    locating an affinity indicator nearest to the intensifier;
    changing an affinity index by an affinity amount corresponding to the intensifier and the affinity indicator nearest to the intensifier; and
    changing the emotive index by the affinity index.

2. The method of claim 1, wherein identifying words to be analyzed in the message includes:
    identifying noise text in the message; and
    excluding the noise text from the identified words.

3. The method of claim 2, wherein the noise text is an earlier message.

4. The method of claim 2, wherein the noise text is a footer.

5. The method of claim 2, wherein the noise text is primarily comprised of words that have been cut from a document and pasted into the message.

6. The method of claim 1, further comprising;
    identifying noise text in the message;
    counting the number of words in the noise text; and
    decrementing the word count value by a noise text amount corresponding to the number of words in the noise text.

7. The method of claim 6, wherein the noise text is an earlier message.

8. The method of claim 6, wherein the noise text is a footer.

9. The method of claim 6, wherein the noise text is primarily comprised of words that have been cut from a document and pasted into the message.

10. The method of claim 1, wherein the ending point is reached once the word count value is equal to the threshold value.

11. The method of claim 1, wherein the ending point is reached once the last word in the message has been counted.

12. The method of claim 1, further comprising:
    determining whether the word count index is less than a threshold value; and
    providing an indication that the emotive index can not be determined.

13. The method of claim 1, wherein the affinity amount is determined by counting the number of times the affinity indicator is identified in the identified words.

14. The method of claim 1, wherein the affinity amount is a first value if the affinity indicator is found at least once in the identified words.

15. The method of claim 1, wherein the affinity indicator is identified if a first word and a second word are found in the identified words.

16. The method of claim 1, wherein the affinity indicator is a phrase.

17. The method of claim 1, wherein the affinity indicator is a group of words.

18. The method of claim 1, further comprising:
    providing a list of intensifiers;
    analyzing the identified words to find an intensifier;
    changing an intensifier index by an intensifier amount, if the intensifier is found in the identified words; and changing the emotive index by an additional amount corresponding to the intensifier index and the affinity index.

19. The method of claim 18, wherein the intensifier is an adjective.

20. The method of claim 18, wherein the intensifier is an adverb.

21. The method of claim 1, further comprising:
grouping the affinity indicators into at least two classes;
determining which classes were found in the identified words; and
sending a signal if a predetermined group of classes is among the classes found in the identified words.

22. The method of claim 21, further comprising:
determining a class value corresponding to those affinity indicators of a sampling class found in the identified words; and
changing the emotive index by the class value.

23. The method of claim 1, further comprising:
providing a list of antagonism indicators;
analyzing the identified words to find an antagonism indicator;
changing an antagonism index by an antagonism amount, if the antagonism indicator is found; and
changing the emotive index by the antagonism index.

24. The method of claim 23, wherein the antagonism amount is determined by counting the number of times the antagonism indicator is found in the identified words.

25. The method of claim 23, wherein the antagonism amount is a first value if the antagonism indicator is found at least once in the identified words.

26. The method of claim 23, wherein the antagonism indicator is found if a first word and a second word are found in the identified words.

27. The method of claim 23, wherein the antagonism indicator is a phrase.

28. The method of claim 23, wherein the antagonism indicator is a group of words.

29. The method of claim 23, further comprising:
changing an intensifier index by an intensifier amount, if the intensifier is found in the identified words; and
changing the emotive index by an additional amount corresponding to the intensifier index and the antagonism index.

30. The method of claim 29, wherein the intensifier is an adjective.

31. The method of claim 29, wherein the intensifier is an adverb.

32. The method of claim 23, further comprising:
grouping the antagonism indicators into at least two classes;
determining which classes were found in the identified words; and
sending a signal if a predetermined group of classes is among the classes found in the identified words.

33. The method of claim 1, further comprising:
providing a list of antagonism indicators in a sampling class;
analyzing the identified words to find the antagonism indicators;
determining a class value corresponding to the antagonism indicators of the sampling class found in the identified words;
determining an antagonism amount corresponding to the class value;

changing an antagonism index by the antagonism amount; and
changing the emotive index by the antagonism index.

34. The method of claim 1, further comprising:
providing a list of antagonism indicators;
analyzing the identified words to find antagonism indicators;
locating an antagonism indicator nearest to the intensifier;
changing an antagonism index by an antagonism amount corresponding to the intensifier and the antagonism indicator nearest to the intensifier; and
changing the emotive index by the antagonism index.

35. A method of determining an emotive index for a message, comprising:
receiving a message;
identifying words to be analyzed in the message to provide identified words;
providing a list of affinity indicators;
analyzing the identified words to find an affinity indicator in the message;
changing an affinity index by an affinity amount corresponding to the affinity indicator found in the message;
providing a list of antagonism indicators;
analyzing the identified words to find an antagonism indicator in the message;
changing an antagonism index by an antagonism amount corresponding to the antagonism indicator found in the message;
changing an emotive index by a difference amount equal to the difference between the absolute value of the affinity index and the absolute value of the antagonism index;
providing a list of intensifiers;
analyzing the identified words to find intensifiers in the message;
changing an intensifier index by an intensifier amount;
comparing the absolute value of the affinity index to the absolute value of the antagonism index to determine which absolute value is greater;
selecting the affinity index if the absolute value of the affinity index is greater than the absolute value of the antagonism index, and selecting the antagonism index if the absolute value of the antagonism index is greater than the absolute value of the affinity index; and
changing the emotive index by a modified index corresponding to the intensifier index multiplied by the selected one of the affinity index and the antagonism index.

36. The method of claim 35, further comprising changing the emotive index by an additional amount equal to the affinity index if the antagonism index was selected, and equal to the antagonism index if the affinity index was selected.

37. The method of claim 35, wherein the intensifier amount corresponds to the intensifiers found in the identified words.

38. The method of claim 35, further comprising:
grouping the affinity indicators into at least two classes;
grouping the antagonism indicators into at least two additional classes;
determining which classes were found in the identified words; and
sending a signal if a predetermined group of classes is among the classes found in the identified words.

39. The method of claim 35, further comprising:
grouping the affinity indicators into at least a first class and a second class;

grouping the antagonism indicators into at least a third class and a fourth class;
determining which classes were found in the identified words; and
sending a signal if at least one of the classes was found in the identified words and if at least one of the classes was not found in the identified words.

40. The method of claim 35, further comprising:
incrementing a word count value each time an identified word is found until an ending point is reached;
determining whether the word count value is greater than a threshold value;
setting a word count index equal to a first value if the word count value is greater than the threshold value, and setting the word count index equal to a second value if the word count value is not greater than the threshold value; and
changing the emotive index by the word count index.

41. A computer readable storage medium having encoded thereon computer readable instructions capable of instructing a computer to:
receive a message;
identify words to be analyzed in the message to provide identified words;
increment a word count value each time one of the identified words is found until an ending point is reached;
determine whether the word count value is greater than a threshold value;
set a word count index equal to a first value if the word count value is greater than the threshold value, and set the word count index equal to a second value if the word count value is not greater than the threshold value;
change an emotive index by the word count index;
provide a list of intensifiers;
analyze the identified words to find an intensifier;
provide a list of affinity indicators;
analyze the identified words to find affinity indicators;
locate an affinity indicator nearest to the intensifier;
change an affinity index by an affinity amount corresponding to the intensifier and the affinity indicator nearest to the intensifier; and
change the emotive index by the affinity index.

42. A computer readable storage medium having encoded thereon computer readable instructions capable of instructing a computer to:
receive a message;
identify words to be analyzed in the message to provide identified words;
receive a list of affinity indicators;
analyze the identified words to find an affinity indicator in the message;
change an affinity index by an affinity amount corresponding to the affinity indicator found in the message;
receive a list of antagonism indicators;
analyze the identified words to find an antagonism indicator in the message;
change an antagonism index by an antagonism amount corresponding to the antagonism indicator found in the message;
provide a list of intensifiers;
analyze the identified words to find intensifiers in the message;
change an intensifier index by an intensifier amount;
compare the absolute value of the affinity index to the absolute value of the antagonism index to determine which absolute value is greater;
select the affinity index if the absolute value of the affinity index is greater than the absolute value of the antagonism index, and selecting the antagonism index if the absolute value of the antagonism index is greater than the absolute value of the affinity index; and
change the emotive index by a modified index corresponding to the intensifier index multiplied by the selected one of the affinity index and the antagonism index.

43. A method of determining an emotive index for a message, comprising:
receiving a message;
identifying words to be analyzed in the message to provide identified words;
incrementing a word count value each time an identified word is encountered until an ending point is reached;
determining whether the word count value is greater than a threshold value;
setting a word count index equal to a first value if the word count value is greater than a threshold value, and setting the word count index equal to a second value if the word count value is not greater than the threshold value;
changing an emotive index by the word count index;
providing a list of intensifiers;
analyzing the identified words to find an intensifier;
providing a list of antagonism indicators;
analyzing the identified words to find antagonism indicators;
locating an antagonism indicator nearest to the intensifier;
changing an antagonism index by an antagonism amount corresponding to the intensifier and the antagonism indicator nearest to the intensifier; and
changing the emotive index by the antagonism index.

44. The method of claim 43, wherein identifying words to be analyzed in the message includes:
identifying noise text in the message; and
excluding the noise text from the identified words.

45. The method of claim 44, wherein the noise text is an earlier message.

46. The method of claim 44, wherein the noise text is a footer.

47. The method of claim 44, wherein the noise text is primarily comprised of words that have been cut from a document and pasted into the message.

48. The method of claim 43, further comprising;
identifying noise text in the message;
counting the number of words in the noise text; and
decrementing the word count value by a noise text amount corresponding to the number of words in the noise text.

49. The method of claim 48, wherein the noise text is an earlier message.

50. The method of claim 48, wherein the noise text is a footer.

51. The method of claim 48, wherein the noise text is primarily comprised of words that have been cut from a document and pasted into the message.

52. The method of claim 43, wherein the ending point is reached once the word count value is equal to the threshold value.

53. The method of claim 43, wherein the ending point is reached once the last word in the message has been counted.

54. The method of claim 43, further comprising:
determining whether the word count index is less than a threshold value; and
providing an indication that the emotive index can not be determined.

55. The method of claim 43, wherein the antagonism amount is determined by counting the number of times the antagonism indicator is identified in the identified words.

56. The method of claim 43, wherein the antagonism amount is a first value if the antagonism indicator is found at least once in the identified words.

57. The method of claim 43, wherein the antagonism indicator is identified if a first word and a second word are found in the identified words.

58. The method of claim 43, wherein the antagonism indicator is a phrase.

59. The method of claim 43, wherein the antagonism indicator is a group of words.

60. The method of claim 43, further comprising:
changing an intensifier index by an intensifier amount, if the intensifier is found in the identified words; and
changing the emotive index by an additional amount corresponding to the intensifier index and the antagonism index.

61. The method of claim 60, wherein the intensifier is an adjective.

62. The method of claim 60, wherein the intensifier is an adverb.

63. The method of claim 43, further comprising:
grouping the antagonism indicators into at least two classes;
determining which classes were found in the identified words; and
sending a signal if a predetermined group of classes is among the classes found in the identified words.

64. The method of claim 63, further comprising:
determining a class value corresponding to those antagonism indicators of a sampling class found in the identified words; and
changing the emotive index by the class value.

65. The method of claim 43, further comprising:
providing a list of affinity indicators;
analyzing the identified words to find an affinity indicator;
changing an affinity index by an affinity amount, if the affinity indicator is found; and
changing the emotive index by the affinity index.

66. The method of claim 65, wherein the affinity amount is determined by counting the number of times the affinity indicator is found in the identified words.

67. The method of claim 65, wherein the affinity amount is a first value if the affinity indicator is found at least once in the identified words.

68. The method of claim 65, wherein the affinity indicator is found if a first word and a second word are found in the identified words.

69. The method of claim 65, wherein the affinity indicator is a phrase.

70. The method of claim 65, wherein the affinity indicator is a group of words.

71. The method of claim 65, further comprising:
changing an intensifier index by an intensifier amount, if the intensifier is found in the identified words; and
changing the emotive index by an additional amount corresponding to the intensifier index and the affinity index.

72. The method of claim 71, wherein the intensifier is an adjective.

73. The method of claim 71, wherein the intensifier is an adverb.

74. The method of claim 65, further comprising:
grouping the affinity indicators into at least two classes;
determining which classes were found in the identified words; and
sending a signal if a predetermined group of classes is among the classes found in the identified words.

75. The method of claim 43, further comprising:
providing a list of affinity indicators in a sampling class;
analyzing the identified words to find the affinity indicators;
determining a class value corresponding to the affinity indicators of the sampling class found in the identified words;
determining an affinity amount corresponding to the class value;
changing an affinity index by the affinity amount; and
changing the emotive index by the affinity index.

76. The method of claim 43, further comprising:
providing a list of affinity indicators;
analyzing the identified words to find affinity indicators;
locating an affinity indicator nearest to the intensifier;
changing an affinity index by an affinity amount corresponding to the intensifier and the affinity indicator nearest to the intensifier; and
changing the emotive index by the affinity index.

\* \* \* \* \*